(12) United States Patent
Uselton et al.

(10) Patent No.: US 11,307,173 B1
(45) Date of Patent: Apr. 19, 2022

(54) APPARATUS, SYSTEMS, AND METHODS FOR INSPECTION OF TUBULAR GOODS

(71) Applicant: SCAN SYSTEMS, CORP, The Woodlands, TX (US)

(72) Inventors: Danny Uselton, Spring, TX (US); John Tolman, Humble, TX (US)

(73) Assignee: SCAN SYSTEMS CORP., The Woodlands, TX (US)

( * ) Notice: Subject to any disclaimer, the term of this patent is extended or adjusted under 35 U.S.C. 154(b) by 114 days.

(21) Appl. No.: 16/987,195

(22) Filed: Aug. 6, 2020

Related U.S. Application Data (60) Provisional application No. 62/889,356, filed on Aug. 20, 2019.

(51) Int. Cl.
 *G01N 27/9013* (2021.01)
 *G01N 27/90* (2021.01)

(52) U.S. Cl.
 CPC ....... *G01N 27/902* (2013.01); *G01N 27/9046* (2013.01)

(58) Field of Classification Search
 CPC ............ G01N 27/82–83; G01N 27/87; G01N 27/90–9093
 USPC ................. 324/219–222, 227–230, 239–243
 See application file for complete search history.

(56) References Cited

U.S. PATENT DOCUMENTS

| | | | |
|---|---|---|---|
| 2,563,254 A * | 8/1951 | Lewis | G01B 7/107 324/229 |
| 3,437,917 A | 4/1969 | Gunkel et al. | |
| 3,539,915 A | 11/1970 | Walters et al. | |
| 3,710,236 A | 1/1973 | Halsey et al. | |
| 3,958,049 A | 5/1976 | Payne | |
| 4,058,762 A | 11/1977 | Holt et al. | |

(Continued)

FOREIGN PATENT DOCUMENTS

| | | |
|---|---|---|
| JP | S61277051 A | 12/1986 |
| JP | S63221239 A | 9/1988 |

(Continued)

OTHER PUBLICATIONS

AN9003—A User's Guide to Intrinsic Safety, retrieved from the Internet Jul. 12, 2017.

(Continued)

*Primary Examiner* — Judy Nguyen
*Assistant Examiner* — Rahul Maini
(74) *Attorney, Agent, or Firm* — Jeffrey L. Wendt; The Wendt Firm, P.C.

(57) ABSTRACT

Tubular member end area inspection systems and methods. One system includes a frame, a movable carriage including a magnetic flux generator, and inner and outer detector assemblies. The movable carriage, magnetic flux generator, inner and outer detector assemblies each have an inlet opening for accepting an end area of a tubular member therein and between the inner and outer detector assemblies. The inner and outer detector assemblies each having one or more magnetic or eddy current detectors adapted to be spaced a distance from inner and outer surfaces of the end area of the tubular member. An actuator assembly connecting the frame and the movable carriage includes a sensor adapted to sense an end of the tubular member and direct the movable carriage from a rest position to an inspection position about the end area of the tubular member.

20 Claims, 7 Drawing Sheets

(56) References Cited

U.S. PATENT DOCUMENTS

| | | | |
|---|---|---|---|
| 4,217,548 A | 8/1980 | Furukawa et al. | |
| 4,218,651 A | 8/1980 | Ivy | |
| 4,503,393 A * | 3/1985 | Moyer | G01N 27/82 |
| | | | 324/235 |
| 4,510,447 A | 4/1985 | Moyer | |
| 4,602,212 A | 7/1986 | Hiroshima et al. | |
| 4,629,991 A | 12/1986 | Wheeler | |
| 4,675,604 A * | 6/1987 | Moyer | G01N 27/82 |
| | | | 324/220 |
| 4,739,273 A | 4/1988 | Peterson et al. | |
| 4,912,410 A | 3/1990 | Morley | |
| 4,916,394 A | 4/1990 | Thompson | |
| 5,007,291 A | 4/1991 | Walters et al. | |
| 5,030,911 A | 7/1991 | Lam | |
| 5,142,230 A | 8/1992 | Nottingham | |
| 5,157,977 A | 10/1992 | Grubbs | |
| 5,446,382 A | 8/1995 | Flora | |
| 5,671,155 A | 9/1997 | Edens et al. | |
| 5,914,596 A | 6/1999 | Weinbaum | |
| 5,943,632 A | 8/1999 | Edens et al. | |
| 6,316,937 B1 | 11/2001 | Edens | |
| 6,580,268 B2 | 6/2003 | Wolodko | |
| 6,745,136 B2 | 6/2004 | Lam et al. | |
| 6,912,097 B2 | 6/2005 | Woods | |
| 6,924,640 B2 | 8/2005 | Fickert et al. | |
| 7,038,445 B2 | 5/2006 | Walters et al. | |
| 7,107,154 B2 | 9/2006 | Ward | |
| 7,337,673 B2 | 3/2008 | Kennedy et al. | |
| 7,346,455 B2 | 3/2008 | Ward et al. | |
| 7,397,238 B2 | 7/2008 | Walters et al. | |
| 7,560,920 B1 | 7/2009 | Ouyang et al. | |
| 7,622,917 B2 | 11/2009 | Walters et al. | |
| 7,640,811 B2 | 1/2010 | Kennedy et al. | |
| 7,795,864 B2 | 9/2010 | Barolak et al. | |
| 8,020,460 B1 | 9/2011 | Hoyt | |
| 10,082,485 B2 | 9/2018 | Uhlig et al. | |
| 2007/0024278 A1 | 2/2007 | Walters et al. | |
| 2018/0196005 A1 | 7/2018 | Fanini et al. | |

FOREIGN PATENT DOCUMENTS

| | | |
|---|---|---|
| JP | S6447944 A | 2/1989 |
| JP | H01110251 | 4/1989 |
| JP | H01232254 A | 9/1989 |
| JP | H02253152 A | 10/1990 |
| JP | H06148139 A | 5/1994 |
| JP | 2000081419 A | 3/2000 |
| JP | 2014044087 A | 3/2014 |

OTHER PUBLICATIONS

Buckley, J.M., "An introduction to Eddy Current Testing theory and technology", pp. 1-7, Dec. 29, 1998, place of publication unknown, retrieved from the Internet Jun. 13, 2019.

Walters et al., "Using Magnetic Flux Density to Identify Anomalies in Pipe Wall Thickness", pp. 1-21, Dec. 23, 2005, place of publication unknown, retrieved from the Internet Nov. 19, 2012.

Staff report, Hydraulics & Pneumatics, "Fundamentals of quick-acting couplings", pp. 1-12, Jan. 1, 2012, place of publication unknown, retrieved from the Internet May 14, 2019.

HARCO Metal Products Inc., "Telescoping Tube", 1 page, 2013, place of publication unknown, retrieved from the Internet May 13, 2019.

Stanley, R. K., "Electromagnetic Inspection of Carbon Steel Tubes", pp. 1-10, 1998, ASME NDE Group Conference, San Antonio, TX, published by NDE Information Consultants, Houston, Texas.

Jain, N., "The Rebirth of Eddy Current Nondestructive Testing", Quality Magazine, pp. 1-5, Aug. 11, 2014.

Niese et al., "Wall Thickness Measurement Sensor for Pipeline Inspection using EMAT Technology in Combination with Pulsed Eddy Current and MFL", ECNDT2006—Tu.3.1.5, pp. 1-10, published by ECNDT (2006).

\* cited by examiner

APPARATUS, SYSTEMS, AND METHODS FOR INSPECTION OF TUBULAR GOODS

CROSS-REFERENCE TO RELATED APPLICATIONS

This application is entitled to and claims the benefit of earlier filed provisional application No. 62/889,356, filed Aug. 20, 2019, under 35 U.S.C. § 119(e), which earlier filed provisional application is incorporated by reference herein in its entirety.

BACKGROUND INFORMATION

Technical Field

The present disclosure relates to apparatus, systems, and methods useful for testing the quality of tubular goods, particularly the end segments of tubular goods (sometimes referred to in the oil & gas industry as "oil country tubular goods", and herein sometimes as simply "OCTG").

Background Art

As noted in many references, for example, U.S. Pat. No. 4,739,273, although inspection of the shank portion of tubing, casing, and other OCTG is relatively straightforward, the inspection of the end areas of OCTG is not as simple. These ends are often "upset" (manufactured so that the wall of the OCTG is of extra thickness and strength near the end) and threaded. Inspection methods that have been used include magnetic particle inspection methods, which are limited in that the area to be inspected must be thoroughly cleaned before the inspection, and the methods are dependent on the alertness and visual acuity of the inspector. Other methods make use of magnetically sensitive transducers to detect flaws, such as disclosed U.S. Pat. No. 4,503,393, comprising an apparatus for applying a magnetic force to produce a generally axial field through the threaded end of a pipe and having various sensing elements for sensing radial magnetic fields and generating signals corresponding to those magnetic fields. Substantially transverse flaws in the pipe cause discontinuities in the magnetic flux lines which are generated in the pipe. These discontinuities in the magnetic field are detected by the sensing elements. The apparatus is not designed to detect the substantially longitudinal flaws often found in tubing and casing, and are limited in that separate devices must be employed to inspect inner and outer wall surfaces of the end areas. Another apparatus for detecting flaws on the ends of tubular products is disclosed in U.S. Pat. No. 3,710,236, which discloses an apparatus for detecting longitudinal flaws in a magnetically energized body using a pair of overlaying, overlapping Hall devices. The apparatus includes a mounting assembly for fixedly positioning the Hall devices at the proper angle relative to the pipe. Should the body being inspected have both straight and tapered surfaces, the device mounting must be readjusted for inspection of the different surfaces. This apparatus provides no means for mechanically engaging the body being inspected and automatically moving the Hall devices about the end area of the body so as to scan the entire end area. Other patented OCTG inspection methods employing Hall units include U.S. Pat. Nos. 7,038,445 and 7,397,238. The apparatus disclosed in the above-mentioned U.S. Pat. No. 4,739,273 are an improvement but still limited in that separate devices must be employed to inspect inner and outer wall surfaces of the end areas. U.S. Pat. No. 5,157,977 discloses an apparatus for eddy current inspection of inner and outer surfaces, and internal and external threads of end areas of tubulars. The apparatus is a machine for feeding, indexing, testing, and storing tubular goods. The tests may be conducted simultaneously and at each end of the pipe. The pipe is spun during the examination so that the eddy current detectors of the inner and outer surfaces, when driven, trace a helical pattern on the pipe, and the thread detector is driven along the thread by the rotational force applied to the pipe being tested. Unfortunately, eddy current detectors do not detect deep flaws, only surface flaws.

One goal of OCTG producers is high tonnage production per day or other time period, and any process or sub-process that slows down the manufacturing of OCTG or other tubulars is disadvantageous economically. In short, the more tons of pipe out the door the better.

The current means of inspecting OCTG end areas, while admirable, suffer from the simple fact that they take longer time than desired, and/or only inspect the pipe for surface flaws. A need exists for OCTG end area inspection apparatus, systems and methods that assures good, accurate inspections, but are faster, more accurate, and safer than previously known apparatus, systems, and methods. The apparatus, systems, and methods of the present disclosure are directed to these needs.

SUMMARY

In accordance with the present disclosure, apparatus and systems for inspecting OCTG and other tubular end areas are presented, and methods of using same to inspect the end areas of OCTG and other tubulars are described which reduce or overcome many of the faults of previously known apparatus, systems, and methods.

A first aspect of the disclosure is a tubular member end area inspection system comprising:

(a) a frame;

(b) a movable carriage attached to the frame, the movable carriage including a magnetic coil, an inner detector assembly supported by the movable carriage, and an outer detector assembly supported by the movable carriage;

(c) the movable carriage, magnetic coil, inner and outer detector assemblies each having an inlet opening for accepting an end area of a tubular member therein and between the inner and outer detector assemblies, the inner and outer detector assemblies each having one or more (magnetic or eddy current) detectors adapted to be spaced a distance from inner and outer surfaces, respectively, of the end area of the tubular member (using one or more substantially frictionless members) during an inspection; and (d) an actuator assembly connecting the frame and the movable carriage, and comprising a detector adapted to sense an end of the tubular member and direct the movable carriage from a rest position to an inspection position about the end area of the tubular member.

In certain embodiments the magnetic coil may be positioned within a coil annulus of the movable carriage, the coil annulus defined by a generally cylindrical carriage outer wall of diameter d1 and a concentric generally cylindrical carriage inner wall of diameter d2, wherein d1>d2, the generally cylindrical carriage outer wall and the generally cylindrical carriage inner wall each generally parallel to a carriage longitudinal axis, the coil annulus further defined by front and back end plates connecting the generally cylindrical carriage outer wall and the generally cylindrical carriage inner wall.

In certain embodiments the outer detector assembly may be removably attached to an inner surface of the generally cylindrical carriage inner wall.

In certain embodiments the movable carriage may comprise a generally vertical back end wall and a generally vertical support bracket attached thereto, and further comprising a tubular (solid or hollow) inner detector assembly support extending generally perpendicularly to the generally vertical support bracket, the inner detector assembly supported by the tubular inner detector assembly support.

In certain embodiments the tubular inner detector assembly support may be hollow. In certain embodiments the inner detector assembly may comprise a plurality of inner detector support sub-assemblies, and the outer detector assembly may comprise a plurality of outer detector support sub-assemblies.

Certain embodiments may further comprise a carriage conveyor sub-system on which the carriage traverses between the rest position and the inspection position. For example, the conveyor sub-system may comprise a set of rails upon which a set of wheels mounted on the carriage traverse.

In certain embodiments the actuator assembly connecting the frame and the movable carriage may comprise one or more actuators selected from the group consisting of pneumatic, hydraulic, and electronic actuators, and combination thereof.

In certain embodiments the detectors and movable carriage may be operated remotely via wired or wireless communication, and/or locally via on-board batteries, an on-board motor, and one or more programmable logic controllers (PLCs). Certain embodiments may comprise a software module including one or more algorithms for calculating or presenting parameters selected from the group consisting of longest substantially longitudinal flaw, deepest substantially longitudinal flaw, longest substantially transverse flaw, deepest substantially transverse flaw, minimum and maximum wall thickness, and combinations thereof.

A second aspect of the disclosure is a system for inspecting end areas of pipe or other OCTG, the system comprising:

(a) a cabinet comprising an inspection sub-assembly, the inspection sub-assembly comprising a magnetic coil, an inner detector assembly supported by the inspection sub-assembly, and an outer detector assembly supported by the inspection sub-assembly;

(b) the inspection sub-assembly, magnetic coil, inner and outer detector assemblies each having an inlet opening for accepting an end area of a tubular member therein and between the inner and outer detector assemblies, the inner and outer detector assemblies each having one or more (magnetic or eddy current) detectors adapted to be spaced a distance from inner and outer surfaces, respectively, of the end area of the tubular member (using one or more substantially frictionless members) during an inspection; and (c) a detector positioned in the inspection sub-assembly and adapted to sense an end of the tubular member and signal the one or more (magnetic or eddy current) detectors to begin inspection of the end area of the tubular member once positioned in the inspection sub-assembly.

In certain embodiments the magnetic coil may be positioned within a coil annulus of the inspection sub-assembly, and the coil annulus is positioned inside the cabinet, the coil annulus defined by a generally cylindrical outer wall of diameter d1 and a concentric generally cylindrical inner wall of diameter d2, wherein d1>d2, the generally cylindrical outer wall and the generally cylindrical inner wall each generally parallel to an inspection sub-assembly horizontal axis, the coil annulus further defined by front and back end plates connecting the generally cylindrical outer wall and the generally cylindrical inner wall.

In certain embodiments the outer detector assembly may be removably attached to an inner surface of the generally cylindrical inner wall.

In certain embodiments the inspection sub-assembly may comprise a generally vertical back end wall and a generally vertical support bracket attached thereto, and further comprising a tubular (solid or hollow) inner detector assembly support extending generally perpendicularly to the generally vertical support bracket, the inner detector assembly supported by the tubular inner detector assembly support.

In certain embodiments the tubular inner detector assembly support may be hollow.

Certain embodiments may further comprise a tubular conveyor sub-system on which the tubulars traverse before and after being inspected at the inspection sub-assembly.

Certain embodiments may further comprise one or more actuators (in certain embodiments, one or more robots) adapted to pick up the tubular being inspected and insert the end area into the inspection sub-assembly, the one or more actuators selected from the group consisting of pneumatic, hydraulic, and electronic actuators, and combination thereof.

Methods for accurately, quickly, and safely inspecting end areas of OCTG and other tubulars are further aspects of the disclosure and described herein.

These and other features of the apparatus, systems, and methods of the disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain apparatus and methods may comprise a number of physical components and features, but may be devoid of certain optional hardware and/or other features.

BRIEF DESCRIPTION OF THE DRAWINGS

The manner in which the objectives of this disclosure and other desirable characteristics can be obtained is explained in the following description and attached drawings in which.

Figure 6:
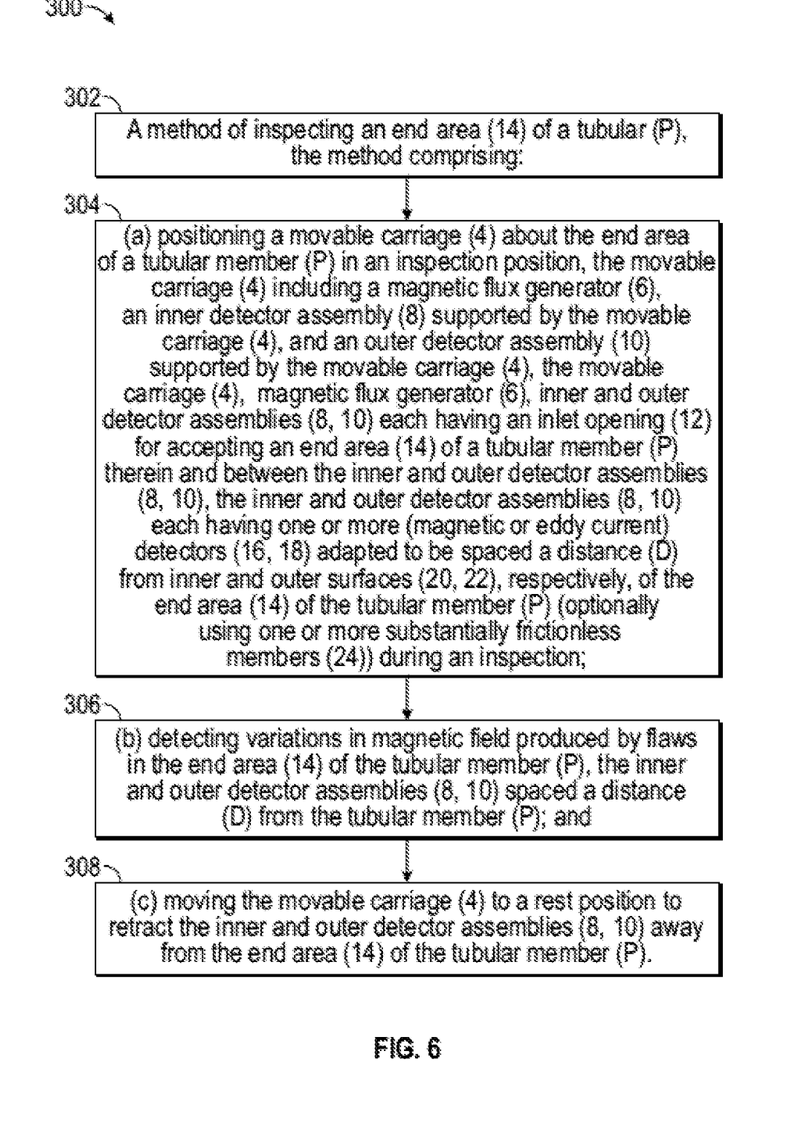
FIGS. 6, 7, and 8 are logic diagrams of three methods of inspecting end areas of pipe or other OCTG in accordance with the present disclosure.
Figure 7:
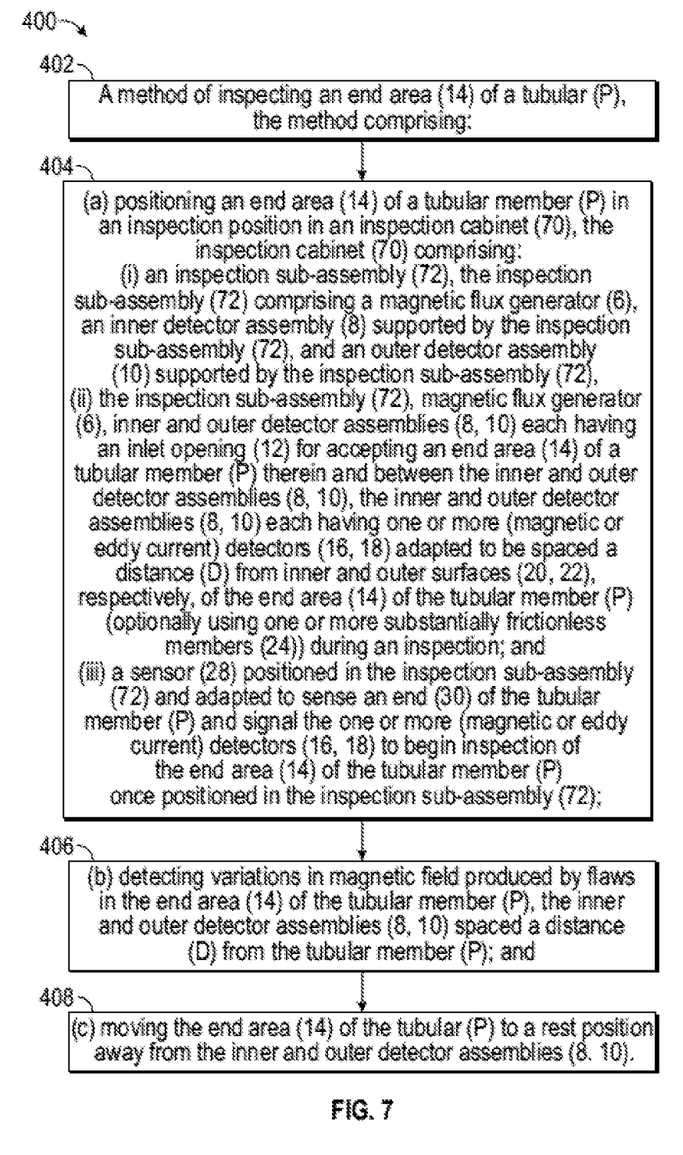
Figure 8:
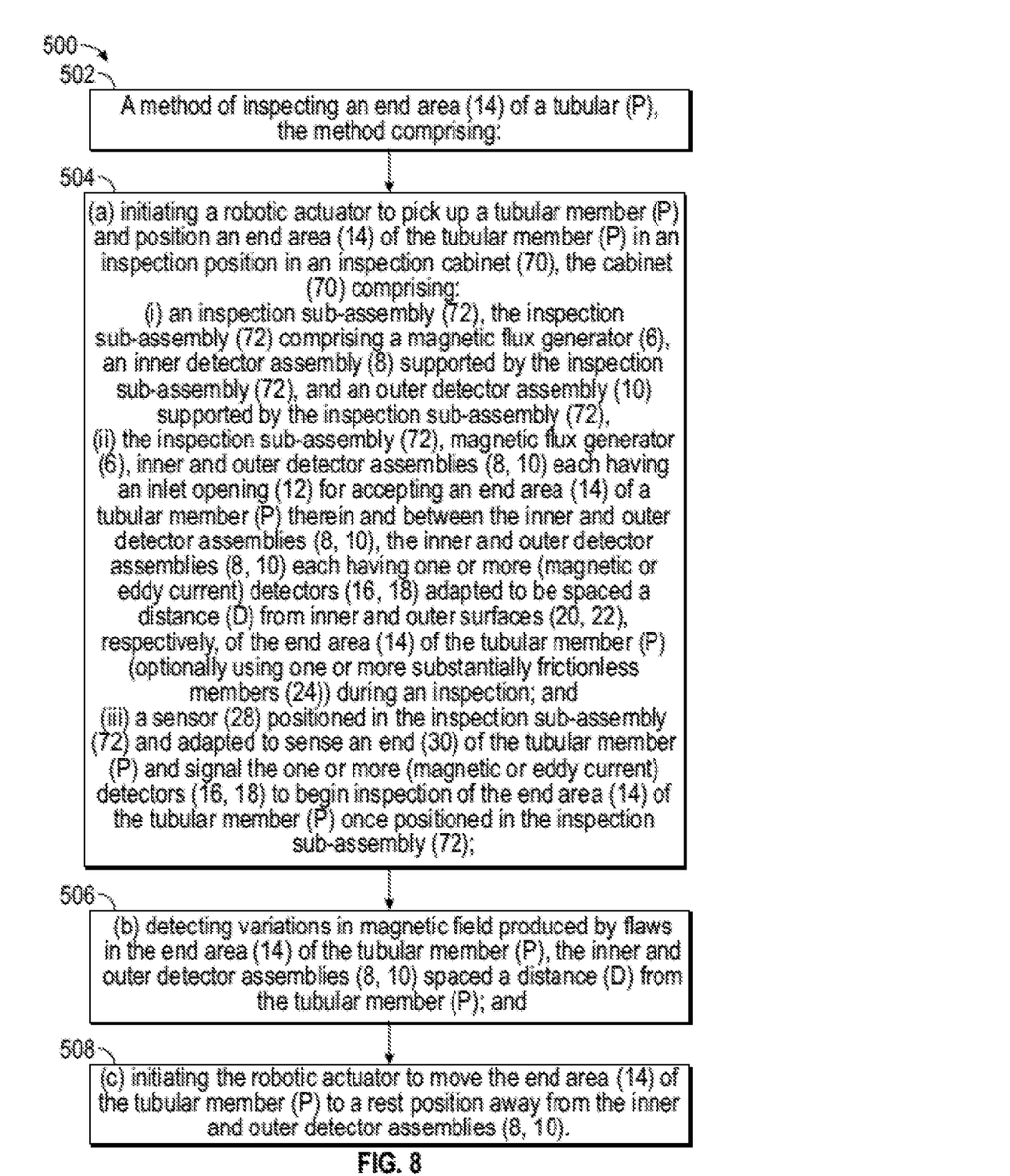

It is to be noted, however, that the appended drawings of FIGS. 1-5 may not be to scale and illustrate only typical system and apparatus embodiments of this disclosure. Furthermore, FIGS. 6-8 illustrate only three of many possible methods of this disclosure. Therefore, the drawing figures are not to be considered limiting in scope, for the disclosure

DETAILED DESCRIPTION

In the following description, numerous details are set forth to provide an understanding of the disclosed apparatus, combinations, and methods. However, it will be understood by those skilled in the art that the apparatus, systems, and methods disclosed herein may be practiced without these details and that numerous variations or modifications from the described embodiments may be possible. All U.S. published patent applications and U.S. patents referenced herein are hereby explicitly incorporated herein by reference, irrespective of the page, paragraph, or section in which they are referenced. Where a range of values describes a parameter, all sub-ranges, point values and endpoints within that range are explicitly disclosed herein.

The present disclosure describes apparatus, systems, and methods for inspection of end areas of OCTG or other tubular or pipe. As mentioned herein, OCTG means any tubular used in the oil & gas industry, except solid tubulars, including but not limited to, drill pipe, line pipe, casing, coiled tubing, and the like, including those that have been through none, all or a combination of any one or more of the common mechanical, thermal, chemical OCTG treatment methods.

The apparatus may comprise a single or multiple detectors (sometimes referred to herein as "detector elements", "instruments", "detectors", or "detector elements") using magnetic flux leakage principles, eddy current, or a combinations of these, to inspect OCTG for the presence of flaws. The detector(s) may be mounted on the apparatus through a variety of ways depending on the detector being installed, positions available in the apparatus, and the accuracy of flaw detection required. Software either intrinsic to the detector, or installed elsewhere in the apparatus, or installed remotely on a computer type device, converts the measurements into usable calculated information. The usable calculated information may be displayed locally at the device and/or remotely on a computer type device. Digital signal processing software, known under the trade designation Digi-Pro™, available from Scan Systems Corp, Houston, Tex., allows 100 percent of the inspection signal to be digitized and processed within a computer. The computer and digital signal processing software known under the trade designation Digi-Pro™ may utilize a series of virtual printed circuit boards known under the trade designation SimKardz™ to perform the calculations required. Signals may be captured from the detectors and digitized almost immediately, then processed through one or more algorithms to produce large signal to noise ratios. Improvements in signal to noise ratios of at least 20 percent, sometimes at least 100 percent, and in certain embodiments even 200 percent have been seen, compared with existing industry standard equipment. Hall Element devices may be used to sense the electrical shift in voltage during the inspection methods of the invention; however, there could be any number of different sensing technologies that could be used, eddy current being one of the other preferred sensing technologies.

In certain embodiments, the magnetic field fluctuation detectors are hall units. Other similar devices may be utilized with the method, selected from magneto resistors, magneto diodes, and combinations of hall units, magneto resistors, and magneto diodes. As noted in U.S. Pat. No. 7,038,445, the number of flux lines flowing through the hall detector will be a function of the wall thickness of the material being monitored. Therefore, this monitoring device of the hall units spaced within the inside circumference of a magnetic coil provides the means of measuring the wall thickness of the pipe or OCTG. In certain embodiments, an "or" circuit may be interconnected with each group of magnetic fluctuation detectors so that the largest signal generated from a group of hall units may be determined. In certain embodiments, a defect monitor may be interconnected with each group of the magnetic fluctuation detectors to identify defective hall units.

The term "pipe," as used herein, includes any pipe, hose, tube, pole, shaft, cylinder, duct, rod, oil field tubular, tubing for the flow of oil or gas, casing, drill pipe, oil field tubulars and equivalents thereof made in whole or part of a ferromagnetic material. The term "flaw" as used herein includes any defects, discontinuities or irregularities in the walls or on the surface of the pipe, for example, seams, cracks, chips, and unusual wear.

The term "magnetic field fluctuation detector," used herein, includes hall units, magneto diodes and magneto resistors. Preferably the magnetic fluctuation detector utilized with the invention is a hall unit. The term "hall unit," as used herein, includes any Hall detector, and any device or detector which produces a voltage in relation to a magnetic field applied to the detector. Although well known, a brief description of the hall detector is provided. A Hall detector is generally manufactured as a four terminal solid state device which produces an output voltage proportional to the product of an input current, a magnetic flux density and the sine of the angle between magnetic flux density and the plane of the hall detector. A Hall detector typically has an active element and two pairs of ohmic contacts. An electric current flows between two contacts aligned in one direction x. This current, the magnitude and direction of which are known from a calibration stage, in the presence of a perpendicular magnetic field, generates a respective Hall voltage in the other two contacts aligned in a transverse direction y. As known, a Hall detector is sensitive to that component of the magnetic field which is perpendicular to its surface. More specifically, the Hall voltage is responsive to the current flow and to the strength of a magnetic field provided within the vicinity of the Hall detector.

The terms "magnetic field generator" and "magnetic coil" as used herein, include any device capable of generating a horizontal magnetic field of flux. Preferably the magnetic field generator is a coil such an encircling coil or circular coil with multi-turns of wire located in the cavities of the coil.

Eddy current inspection, as explained in U.S. Pat. No. 5,142,230, is a non-destructive procedure used to detect flaws and stress corrosion in electrically conductive materials. This method involves placing an eddy current probe, comprising a coil, near the electrically conductive material. The coil sets up a magnetic field and induces eddy currents in the material. Defects in the material alter the eddy current flow and change the impedance of the coil. As a result, flaws and stress corrosion may be detected by moving the eddy current probe along the material and detecting changes of impedance of the coil.

The primary features of the apparatus, systems, and methods of the present disclosure will now be described with reference to the drawing figures, after which some of the construction and operational details, some of which are optional, will be further explained. The same reference numerals are used throughout to denote the same items in the figures. In certain embodiments, the variations in the magnetic field detected by magnetic flux detectors and the variations in eddy current detected by eddy current detectors are provided by spacing the detectors so that their respective magnetic or electric fields abut and provide a minimum of 100 percent inspection of the tubular member.

Figure 1:
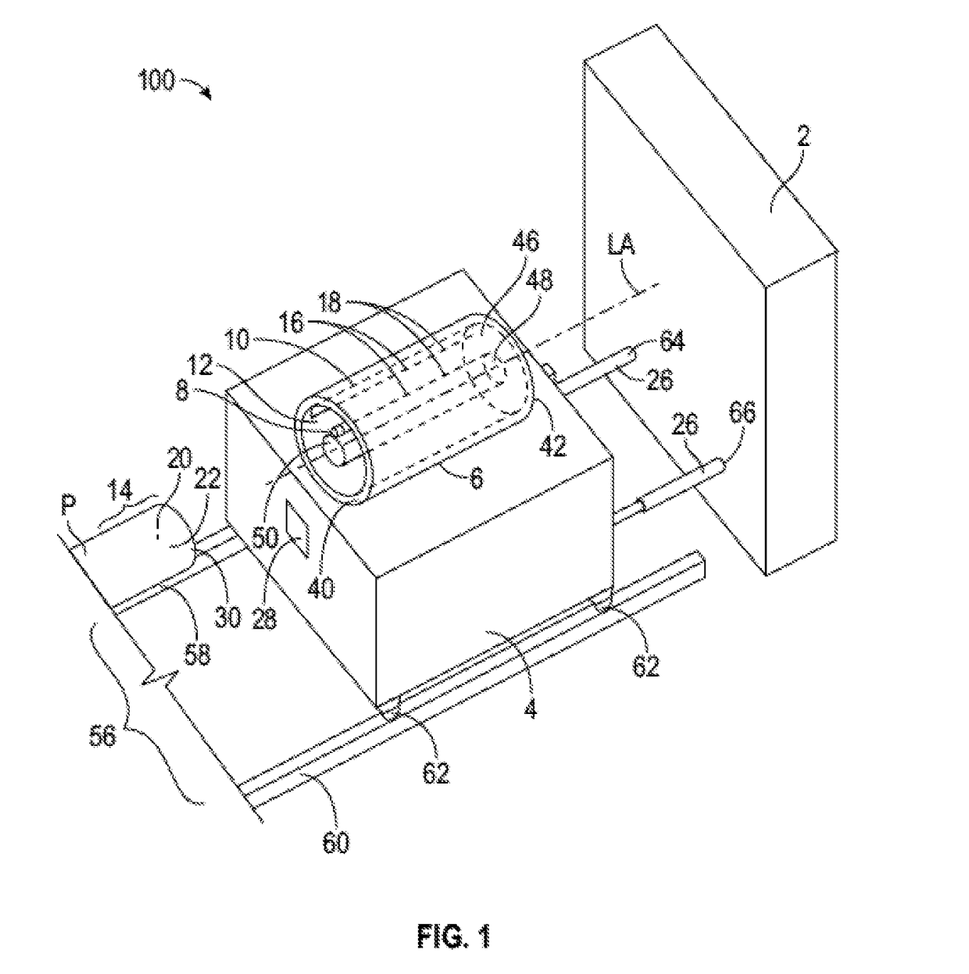
FIG. 1 is a schematic perspective view of one system embodiment of the present disclosure.
Figure 2:
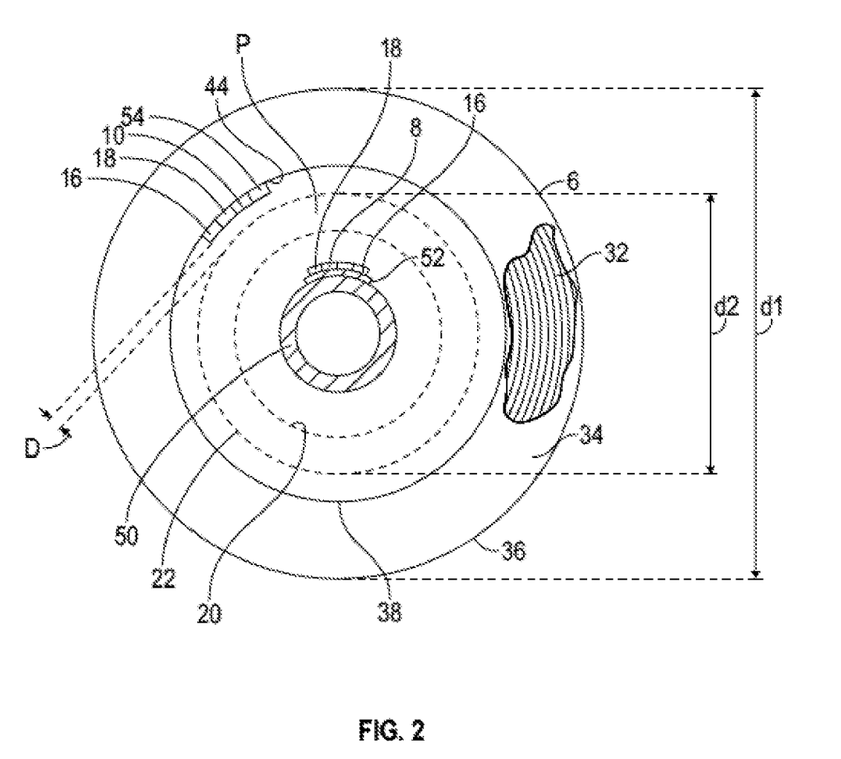
FIG. 2 is a schematic end elevation view of the inspection apparatus of the system of FIG. 1.

Referring to FIGS. 1 and 2, certain embodiments, such as embodiment 100 illustrated schematically in FIG. 1, may comprise a frame 2 and a movable carriage 4, the attached to frame 2, movable carriage 4 including a magnetic flux generator 6, an inner detector assembly 8 supported by movable carriage 4, and an outer detector assembly 10 supported by movable carriage 4. Movable carriage 4, magnetic flux generator 6, inner and outer detector assemblies 8, 10 each have an inlet opening 12 for accepting an end area 14 of a tubular member (P) therein and between inner and outer detector assemblies 8, 10. Inner and outer detector assemblies 8, 10 each have one or more magnetic flux detectors 16, eddy current detectors 18, or both adapted to be spaced a distance (D) from inner and outer surfaces 20, 22, respectively, of end area 14 of tubular member P.

Optionally, inner and outer detector assemblies 8, 10, may be supported by, and spaced the distance D from the inner and outer surfaces 20, 22, by one or more substantially frictionless members during an inspection, as taught in assignee's U.S. Pat. No. 7,397,238.

Still referring to FIGS. 1 and 2, embodiment 100 may comprise an actuator assembly 26 connecting frame 2 and movable carriage 4, and comprising a sensor 28 adapted to sense an end 30 of tubular member (P) and direct movable carriage 4 from a rest position to an inspection position about end area 14 of tubular member P.

In embodiment 100, magnetic flux generator 6 is a coil 32, but this is not strictly necessary, as any magnetic flux generator may be used, such as one or more permanent magnets. A combination of one or more coils and one or more permanent magnets may also be employed, although that may add unneeded complexity. Coil 32 is positioned within a coil annulus 34 of movable carriage 4. Coil annulus 34 is defined by a generally cylindrical outer wall 36 of diameter d1 and a concentric generally cylindrical inner wall 38 of diameter d2, wherein d1>d2. Generally cylindrical outer wall 36 and generally cylindrical inner wall 38 are each generally parallel to a carriage longitudinal axis (LA). Coil annulus 34 is further defined by front and back end plates 40, 42 connecting generally cylindrical outer wall 36 and the generally cylindrical inner wall 38 at their peripheral edges. Outer detector assembly 10 is removably attached to an inner surface 44 of generally cylindrical inner wall 38.

Figure 3:
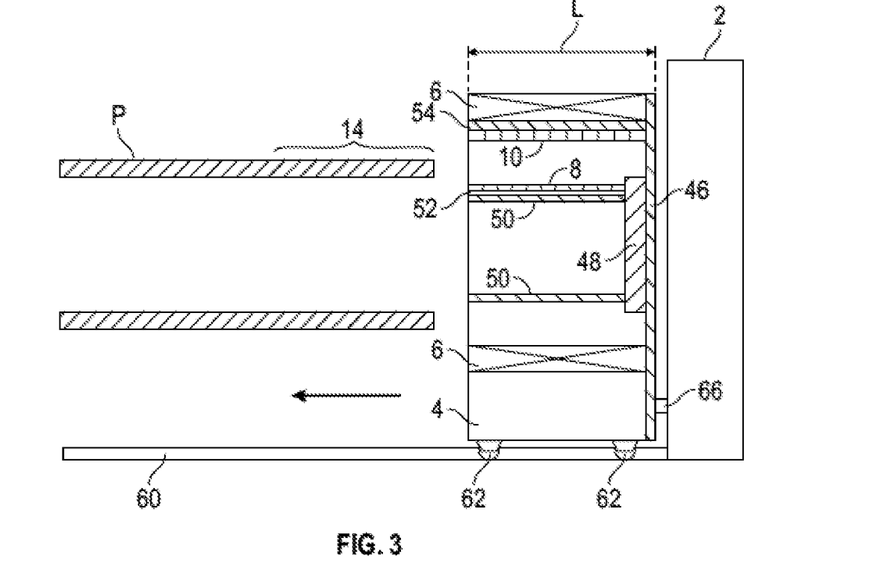
FIG. 3 is a schematic side elevation view of the system illustrated schematically in FIG. 1 in rest position.
Figure 4:
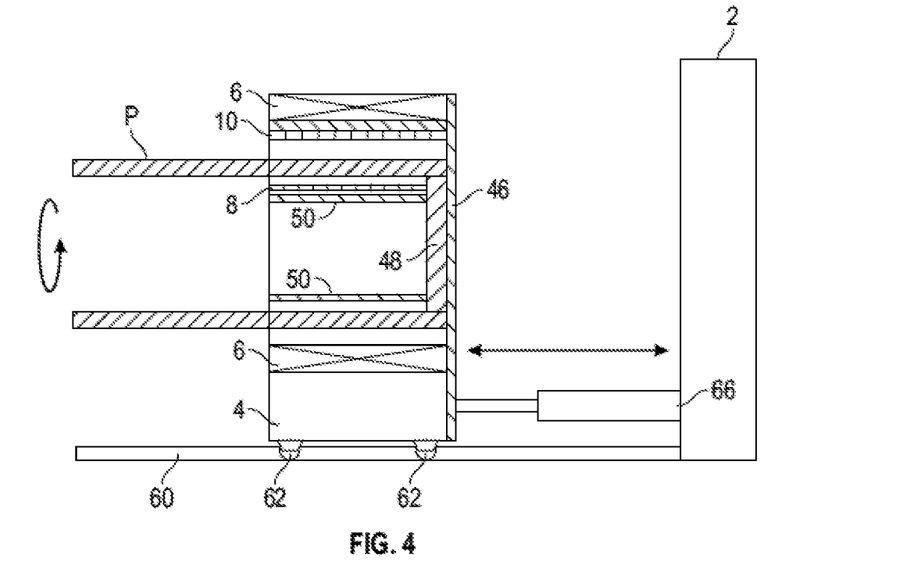
FIG. 4 is a schematic side elevation view of the system illustrated schematically in FIG. 1 in inspection position.

Still referring to FIGS. 1 and 2, as well as FIGS. 3 and 4, movable carriage 4 in embodiment 100 comprises a generally vertical back end wall 46 and a generally vertical support bracket 48 attached thereto (welded, brazed, or formed integrally therewith), and further comprising an inner detector assembly support 50 extending generally perpendicularly to generally vertical support bracket 48. Inner detector assembly 8 is supported by inner detector assembly support 50, which may be a tubular member (solid or hollow). A hollow tubular may be beneficial for inner detector assembly support 50 for mounting or routing wires and other components for transmitting signals from the magnetic flux detectors and eddy current detectors to signal processing components. These components are well understood in the art and require no further explanation to the skilled artisan.

Embodiment 100 features the inner detector assembly 8 comprising a plurality of inner detector support sub-assemblies 52, and the outer detector assembly 10 comprises a plurality of outer detector support sub-assemblies 54. These may be non-conductive members. Furthermore, the magnetic detectors and eddy current detectors may each have plastic protective shims or other material between the detectors and the OCTG or pipe being inspected, for protection purposes. This is also well-known in the art and requires no further explanation.

Embodiment 100 may further comprise a carriage conveyor sub-system 56 on which movable carriage 4 traverses between the rest position and the inspection position. In embodiment 100, carriage conveyor sub-system 56 comprises a set of rails 58, 60 upon which a set of wheels 62 mounted on movable carriage 4 traverse. Actuator assembly 26 connecting frame 2 and movable carriage 4 comprises, in this embodiment, one or more actuators 64, 66 selected from the group consisting of pneumatic, hydraulic, and electronic actuators, and combinations thereof.

FIGS. 3 and 4 are schematic side elevation views of the system illustrated schematically in FIGS. 1 and 2, with parts cut-away, illustrating movable carriage 4 in a rest position, and illustrating that movable carriage 4 has a depth or length (L) that is at least as long as end area 14 of tubular member P. The left-pointing arrow in FIG. 3 indicates the direction of movement when movable carriage 4 moves from the rest position to an inspection position, as illustrated in FIG. 4. Inspection may occur while movable carriage 4 moves either left or right (as indicated by the double-headed arrow) as viewed in FIG. 4, or in both directions. In any case, with the configuration of detectors where there is at least one magnetic flux detector 16 and at least one eddy current detector 18 on the inner and outer detectors assemblies 8, 10, end area 14 may be fully inspected for flaws in as little as 10 seconds when rotated as depicted schematically in FIG. 4 by the curved arrow, or as little as 7 seconds.

Figure 5:
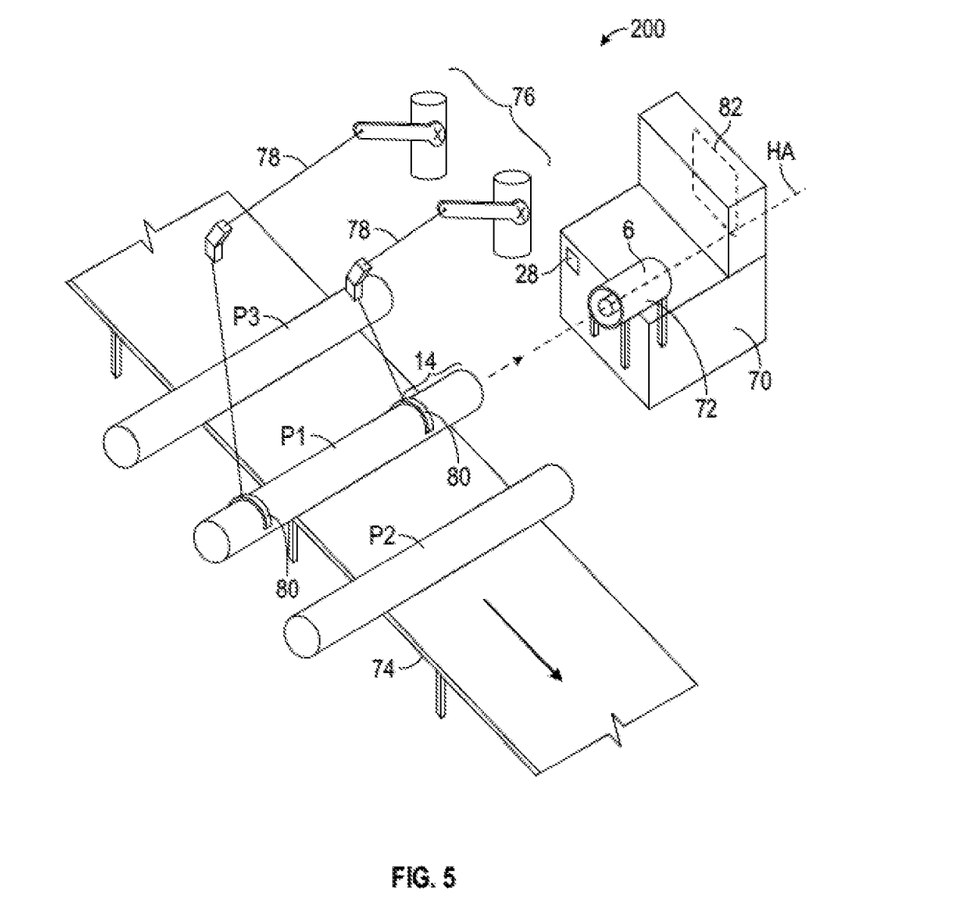
FIG. 5 is a schematic perspective view of another system embodiment of the present disclosure.

FIG. 5 is a schematic perspective view of another system embodiment 200 of the present disclosure, featuring a cabinet 70 comprising an inspection sub-assembly 72. Inspection sub-assembly 72 comprises a magnetic flux generator 6, an inner detector assembly 8 supported by the inspection sub-assembly 72, and an outer detector assembly 10 supported by inspection sub-assembly 72. Inspection sub-assembly 72, magnetic flux generator 6, and inner and outer detector assemblies 8, 10 each share an inlet opening 12 for accepting end area 14 of tubular member (P) therein and between inner and outer detector assemblies 8, 10. Inner and outer detector assemblies 8, 10 each have one or more magnetic flux detectors 16 or eddy current detectors 18 adapted to be spaced a distance (D) from inner and outer surfaces 20, 22, respectively, of end area 14 of tubular member P. As noted in respect of embodiment 100, optionally one or more substantially frictionless members may be employed during an inspection.

A sensor 28 positioned in inspection sub-assembly 72 is adapted to sense end 30 of tubular member P and signal the one or more magnetic or eddy current detectors 16, 18 to begin inspection of end area 14 of tubular member P once positioned in the inspection sub-assembly 72, or while being moved therein.

Embodiment 200 features the same magnetic flux generator and detector arrangement as embodiment 100, so those features are not further explained in relation to embodiment 200, except to note that coil annulus 34 is positioned inside cabinet 70, where coil annulus 34 is defined as before, and is generally parallel to an inspection sub-assembly horizontal axis (HA). System 200 further comprises a tubular conveyor sub-system 74 on which tubular members P1, P2, and P3 traverse before and after being inspected at the inspection sub-assembly 72. In FIG. 5, tubular member P1 is being inspected, while tubular member P2 has already been inspected, and tubular member P3 is waiting its turn. System embodiment 200 further comprises one or more actuators 76 adapted to pick up tubular member (P1) being inspected (employing manipulators arms 78 and pipe grippers 80) and insert end area 14 of tubular member P1 into inspection sub-assembly 72, the one or more actuators 76 selected from the group consisting of pneumatic, hydraulic, and electronic actuators, and combination thereof. In certain embodiments actuator or actuators 76 may be robotic actuators, such as the IRB 7600 industrial robot, available from ABB Asea Brown Boveri Ltd. Simple cranes or other pipe lifting equipment known in the OCTG inspection industry may also be employed. Actuators may be floor mounted, cabinet-mounted, or roof-mounted. In certain embodiments the actuator(s) should have capacity to lift standard lengths of steel pipe.

FIGS. 6, 7, and 8 are logic diagrams of three method embodiments 300, 400, and 500 of inspecting end areas of pipe or other OCTG in accordance with the present disclosure. Method embodiment 300 of inspecting an end area (14) of a tubular (P), the method comprises (box 302): (a) positioning a movable carriage (4) about the end area of a tubular member (P) in an inspection position, the movable carriage (4) including a magnetic flux generator (6), an inner detector assembly (8) supported by the movable carriage (4), and an outer detector assembly (10) supported by the movable carriage (4), the movable carriage (4), magnetic flux generator (6), inner and outer detector assemblies (8, 10) each having an inlet opening (12) for accepting an end area (14) of a tubular member (P) therein and between the inner and outer detector assemblies (8, 10), the inner and outer detector assemblies (8, 10) each having one or more (magnetic or eddy current) detectors (16, 18) adapted to be spaced a distance (D) from inner and outer surfaces (20, 22), respectively, of the end area (14) of the tubular member (P) during an inspection (box 304); (b) detecting variations in magnetic field produced by flaws in the end area (14) of the tubular member (P), the inner and outer detector assemblies (8, 10) spaced a distance (D) from the tubular member (P) (box 306); and (c) moving the movable carriage (4) to a rest position to retract the inner and outer detector assemblies (8, 10) away from the end area (14) of the tubular member (P) (box 308).

Method embodiment 400 of inspecting an end area (14) of a tubular (P), the method comprises (box 402): (a) positioning an end area (14) of a tubular member (P) in an inspection position in an inspection cabinet (70), the inspection cabinet (70) comprising: (i) an inspection sub-assembly (72), the inspection sub-assembly (72) comprising a magnetic flux generator (6), an inner detector assembly (8) supported by the inspection sub-assembly (72), and an outer detector assembly (10) supported by the inspection sub-assembly (72), (ii) the inspection sub-assembly (72), magnetic flux generator (6), inner and outer detector assemblies (8, 10) each having an inlet opening (12) for accepting an end area (14) of a tubular member (P) therein and between the inner and outer detector assemblies (8, 10), the inner and outer detector assemblies (8, 10) each having one or more (magnetic or eddy current) detectors (16, 18) adapted to be spaced a distance (D) from inner and outer surfaces (20, 22), respectively, of the end area (14) of the tubular member (P) during an inspection; and (iii) a sensor (28) positioned in the inspection sub-assembly (72) and adapted to sense an end (30) of the tubular member (P) and signal the one or more (magnetic or eddy current) detectors (16, 18) to begin inspection of the end area (14) of the tubular member (P) once positioned in the inspection sub-assembly (72)(box 404); (b) detecting variations in magnetic field produced by flaws in the end area (14) of the tubular member (P), the inner and outer detector assemblies (8, 10) spaced a distance (D) from the tubular member (P) (box 406); and (c) moving the end area (14) of the tubular (P) to a rest position away from the inner and outer detector assemblies (8, 10) (box 408).

Method embodiment 500 of inspecting an end area (14) of a tubular member (P), the method comprises (502): (a) initiating a robotic actuator to pick up a tubular member (P) and position an end area (14) of the tubular member (P) in an inspection position in an inspection cabinet (70), the cabinet (70) comprising: (i) an inspection sub-assembly (72), the inspection sub-assembly (72) comprising a magnetic flux generator (6), an inner detector assembly (8) supported by the inspection sub-assembly (72), and an outer detector assembly (10) supported by the inspection sub-assembly (72), (ii) the inspection sub-assembly (72), magnetic flux generator (6), inner and outer detector assemblies (8, 10) each having an inlet opening (12) for accepting an end area (14) of a tubular member (P) therein and between the inner and outer detector assemblies (8, 10), the inner and outer detector assemblies (8, 10) each having one or more (magnetic or eddy current) detectors (16, 18) adapted to be spaced a distance (D) from inner and outer surfaces (20, 22), respectively, of the end area (14) of the tubular member (P) during an inspection; and (iii) a sensor (28) positioned in the inspection sub-assembly (72) and adapted to sense an end (30) of the tubular member (P) and signal the one or more (magnetic or eddy current) detectors (16, 18) to begin inspection of the end area (14) of the tubular member (P) once positioned in the inspection sub-assembly (72) (box 504); (b) detecting variations in magnetic field produced by flaws in the end area (14) of the tubular member (P), the inner and outer detector assemblies (8, 10) spaced a distance (D) from the tubular member (P) (box 506); and (c) initiating the robotic actuator to move the end area (14) of the tubular member (P) to a rest position away from the inner and outer detector assemblies (8, 10) (box 508).

An on-board power unit may be included in certain system embodiments for powering the magnetic flux generator(s), which may be a permanent or rechargeable battery pack or transformer for electrical power, or both. An on-board electronics package may include one or more microprocessors, a communications link (wired or wireless), and/or an on-board controller. A CRT, LED or other human-machine interface 82 may be included (for example as indicated by the dotted line on cabinet 70 in embodiment 200 as illustrated schematically in FIG. 5).

In certain embodiments, sensor 28 may be removably attached to movable carriage 4 or cabinet 70, for example by rubber seals on the outside of sensor 28 or, welding, brazing, threaded couplings, QC/QDC couplings, API couplings, clamps, or other fasteners. In certain embodiments sensor 28 may be a time-of-flight (TOF) sensor, such as a laser, and may have a display included with it. Such TOF sensors are disclosed in assignee's co-pending U.S. patent application Ser. No. 16/987,179, filed Aug. 6, 2020, incorporated herein by reference in its entirety. Rubber or other vibration and shock resistant pads may be placed around the outside of sensor 28 to reduce or eliminate shock and vibration of sensor 28.

Magnetic flux generator(s) 6, detectors 8, 10, and sensor 28 may, in certain embodiments, be powered from within via an instrument display or other human/machine interface (HMI) 82, for example using batteries, Li-ion or other type. In other embodiments display/HMI may be powered from an instrument cable providing power, perhaps by a local generator, or grid power. The display/HMI on apparatus 2 allows an operator to interface with the instrument. In certain embodiments the operator will be able to take measurements, view or read these measurements and reset the instrument for subsequent measurement taking. If the display/HMI is connected to a power cable, then measurements may be taken remotely, stored and reset as necessary.

In certain embodiments power would be supplied at a voltage and current that enables the systems to be intrinsically safe. By "intrinsically safe" is meant the definition of intrinsic safety used in the relevant IEC apparatus standard IEC 60079-11, defined as a type of protection based on the restriction of electrical energy within apparatus and of interconnecting wiring exposed to the potentially explosive atmosphere to a length below that which can cause ignition by either sparking or heating effects. For more discussion, see "AN9003—A User's Guide to Intrinsic Safety", retrieved from the Internet Jul. 12, 2017, and incorporated herein by reference.

Certain embodiments may employ a 3D time of flight detector for sensor 28. Such detectors may be exemplified by those described by Texas Instruments. 3D time of flight products, tools and development kits enable machine vision with a real-time 3D imaging camera. From robotic navigation to gesture recognition and building automation, TI's 3D time of flight chipsets allow for maximum flexibility to customize a camera's design. 3D time of flight operates by illuminating an area with modulated IR light. By measuring the phase change of the reflected signal the distance can be accurately determined for every pixel in the detector creating a 3D map of the subject or scene, for example a rack of pipe or other OCTG.

One suitable TOF detector is the detector known under the trade designation "OPT8241 time-of-flight (TOF) detector" available from Texas Instruments (TI).

The device combines TOF sensing with an optimally-designed analog-to-digital converter (ADC) and a programmable timing generator (TG). The device offers quarter video graphics array (QVGA 320×240) resolution data at frame rates up to 150 frames per second (600 readouts per second). The built-in TG controls the reset, modulation, readout, and digitization sequence. The programmability of the TG offers flexibility to optimize for various length-sensing performance metrics (such as power, motion robustness, signal-to-noise ratio, and ambient cancellation). Features of the TOF detector known under the trade designation "OPT8241 time-of-flight (TOF) detector" available from Texas Instruments (TI) are provided in Table 1.

Table 1

"OPT8241 Time-of-Flight (TOF) Detector"
Available from Texas Instruments (TI)

Imaging Array:
   320×240 Array
   ⅓" Optical Format
   Pixel Pitch: 15 μm
   Up to 150 Frames per Second
Optical Properties:
   Responsivity: 0.35 A/W at 850 nm
   Demodulation Contrast: 45% at 50 MHz
   Demodulation Frequency: 10 MHz to 100 MHz
Output Data Format:
   12-Bit Phase Correlation Data
   4-Bit Common-Mode (Ambient)
Chipset Interface:
   Compatible with TI's Time-of-Flight Controller OPT9221
Detector Output Interface:
   CMOS Data Interface (50-MHz DDR, 16-Lane Data, Clock and Frame Markers)
   LVDS:
     600 Mbps, 3 Data Pairs
     1-LVDS Bit Clock Pair, 1-LVDS Sample Clock Pair
Timing Generator (TG):
   Addressing Engine with Programmable Region of Interest (ROI)
   Modulation Control
   De-Aliasing
   Master, Slave Sync Operation
I²C Slave Interface for Control
Power Supply:
   3.3-V I/O, Analog
   1.8-V Analog, Digital, I/O
   1.5-V Demodulation (Typical)
Optimized Optical Package (COG-78):
   8.757 mm×7.859 mm×0.7 mm
   Integrated Optical Band-Pass Filter (830 nm to 867 nm)
   Optical Fiducials for Easy Alignment
Operating Temperature: 0° C. to 70° C.

What has not been recognized or realized are apparatus, systems, and methods to accurately and repeatably inspect OCTG end areas, especially with a combination of magnetic flux detectors and eddy current detectors, or only with magnetic flux detectors, on both the inside and the outside of the end area. Apparatus, systems, and methods to accomplish this quickly to increase pipe production without significant risk to workers is highly desirable.

In will be apparent that in other embodiments, the various components need not have the shapes illustrated in the various drawing figures, but rather could take any shape, such as a box or cube shape, elliptical, triangular, pyramidal (for example, three or four sided), prism-shaped, hemispherical or semi-hemispherical-shaped (dome-shaped), or combination thereof and the like, as long as the end area of the OCTG is inspected on the inside and outside. It will be understood that such embodiments are part of this disclosure and deemed with in the claims. Furthermore, one or more of the various components may be ornamented with various ornamentation produced in various ways (for example stamping or engraving, or raised features such as reflectors, reflective tape, and the like), oil tool designs, logos, letters, words, nicknames (for example BIG JAKE, and the like). Hand holds may be machined or formed to have easy-to-grasp features for fingers, or may have rubber grips shaped and adorned with ornamental features, such as raised knobby gripper patterns.

Thus the apparatus, systems, and methods described herein provide a quick and safe way of inspecting end areas of OCTG accurately and repeatably.

From the foregoing detailed description of specific embodiments, it should be apparent that patentable apparatus, systems, and methods have been described. Although specific embodiments of the disclosure have been described herein in some detail, this has been done solely for the purposes of describing various features and aspects of the apparatus, systems, and methods, and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, one modification of embodiments 100 and 200 would be to provide rotation of the inspection unit (movable carriage, cabinet, or other structure holding the inner and outer detector assemblies) rather than, or along with, rotation of the OCTG. Such embodiments are considered with the present disclosure.

What is claimed is:

1. A tubular member end area inspection system (100) comprising:
   (a) a frame (2);
   (b) a movable carriage (4) attached to the frame (2), the movable carriage (4) including a magnetic flux generator (6), an inner detector assembly (8) supported by the movable carriage (4), and an outer detector assembly (10) supported by the movable carriage (4);
   (c) the movable carriage (4), magnetic flux generator (6), and inner and outer detector assemblies (8, 10) each having an inlet opening (12) for accepting an end area (14) of a tubular member (P) therein and between the inner and outer detector assemblies (8, 10), the inner and outer detector assemblies (8, 10) each having one or more magnetic and/or eddy current detectors (16, 18) adapted to be spaced a distance (D) from inner and outer surfaces (20, 22), respectively, of the end area (14) of the tubular member (P) during an inspection; and
   (d) an actuator assembly (26) connecting the frame (2) and the movable carriage (4), and comprising a sensor (28) adapted to sense an end (30) of the tubular member (P) and direct the movable carriage (4) from a rest position to an inspection position about the end area (14) of the tubular member (P).

2. The system of claim 1 wherein the magnetic flux generator (6) is a coil (32) positioned within a coil annulus (34) of the movable carriage (4), the coil annulus (34) defined by a generally cylindrical outer wall (36) of diameter d1 and a concentric generally cylindrical inner wall (38) of diameter d2, wherein d1>d2, the generally cylindrical outer wall (36) and the generally cylindrical inner wall (38) each generally parallel to a carriage longitudinal axis (LA), the coil annulus (34) further defined by front and back end plates (40, 42) connecting the generally cylindrical outer wall (36) and the generally cylindrical inner wall (38).

3. The system of claim 2 wherein the outer detector assembly (10) is removably attached to an inner surface (44) of the generally cylindrical inner wall (38).

4. The system of claim 2 wherein the movable carriage (4) comprises a generally vertical back end wall (46) and a generally vertical support bracket (48) attached thereto, and further comprising an inner detector assembly support (50) extending generally perpendicularly to the generally vertical support bracket (48), the inner detector assembly (8) supported by the inner detector assembly support (50).

5. The system of claim 4 wherein the inner detector assembly support (50) is tubular and hollow.

6. The system of claim 1 wherein the inner detector assembly (8) comprises a plurality of inner detector support sub-assemblies (52), and the outer detector assembly (10) comprises a plurality of outer detector support sub-assemblies (54).

7. The system of claim 1 further comprising a carriage conveyor sub-system (56) on which the carriage traverses between the rest position and the inspection position.

8. The system of claim 7 wherein the conveyor sub-system (56) comprises a set of rails (58, 60) upon which a set of wheels (62) mounted on the movable carriage (4) traverse.

9. The system of claim 1 wherein the actuator assembly (26) connecting the frame (2) and the movable carriage (4) comprises one or more actuators (64, 66) selected from the group consisting of pneumatic, hydraulic, and electronic actuators, and combination thereof.

10. A tubular member end area inspection system comprising:
    (a) a cabinet (70) comprising an inspection sub-assembly (72), the inspection sub-assembly comprising a magnetic flux generator (6), an inner detector assembly (8) supported by the inspection sub-assembly (72), and an outer detector assembly (10) supported by the inspection sub-assembly (72);
    (b) the inspection sub-assembly (72), magnetic flux generator (6), and inner and outer detector assemblies (8, 10) each having an inlet opening (12) for accepting an end area (14) of a tubular member (P) therein and between the inner and outer detector assemblies (8, 10), the inner and outer detector assemblies (8, 10) each having one or more magnetic and/or eddy current detectors (16, 18) adapted to be spaced a distance (D) from inner and outer surfaces (20, 22), respectively, of the end area (14) of the tubular member (P) during an inspection; and
    (c) a sensor (28) positioned in the inspection sub-assembly (72) and adapted to sense an end (30) of the tubular member (P) and signal the one or more magnetic and/or eddy current detectors (16, 18) to begin inspection of the end area (14) of the tubular member (P) once positioned in the inspection sub-assembly (72).

11. The system of claim 10 wherein the magnetic flux generator (6) is a coil (32) positioned within a coil annulus (34) of the inspection sub-assembly (72), and the coil annulus (34) is positioned inside the cabinet (70), the coil annulus (34) defined by a generally cylindrical outer wall (36) of diameter d1 and a concentric generally cylindrical inner wall (38) of diameter d2, wherein d1>d2, the generally cylindrical outer wall (36) and the generally cylindrical inner wall (38) each generally parallel to an inspection sub-assembly horizontal axis (HA), the coil annulus (34) further defined by front and back end plates (40, 42) connecting the generally cylindrical outer wall (36) and the generally cylindrical inner wall (38).

12. The system of claim 11 wherein the outer detector assembly (10) is removably attached to an inner surface (44) of the generally cylindrical inner wall (38).

13. The system of claim 11 wherein the inspection sub-assembly (72) comprises a generally vertical back end wall (46) and a generally vertical support bracket (48) attached thereto, and further comprising an inner detector assembly support (50) extending generally perpendicularly to the generally vertical support bracket (48), the inner detector assembly (8) supported by the inner detector assembly support (50).

14. The system of claim 13 wherein the inner detector assembly support (50) is tubular and hollow.

15. The system of claim 10 further comprising a tubular conveyor sub-system (74) on which the tubular members (P) traverse before and after being inspected at the inspection sub-assembly (72).

16. The system of claim 10 further comprising one or more actuators (76) adapted to pick up the tubular member (P) being inspected and insert the end area (14) of the tubular member (P) into the inspection sub-assembly (72), the one or more actuators (76) selected from the group consisting of pneumatic, hydraulic, and electronic actuators, and combination thereof.

17. A tubular member end area inspection system comprising:
   (a) a cabinet (70) comprising an inspection sub-assembly (72), the inspection sub-assembly (72) comprising a magnetic flux generator (6), an inner detector assembly (8) supported by the inspection sub-assembly (72), and an outer detector assembly (10) supported by the inspection sub-assembly (72);
   (b) the inspection sub-assembly (72), magnetic flux generator (6), and inner and outer detector assemblies (8, 10) each having an inlet opening (12) for accepting an end area (14) of a tubular member (P) therein and between the inner and outer detector assemblies (8, 10), the inner and outer detector assemblies (8, 10) each having one or more magnetic and/or eddy current detectors (16, 18) adapted to be spaced a distance (D) from inner and outer surfaces (20, 22), respectively, of the end area (14) of the tubular member (P) during an inspection;
   (c) a sensor (28) positioned in the inspection sub-assembly (72) and adapted to sense an end (30) of the tubular member (P) and signal the one or more magnetic and/or eddy current detectors (16, 18) to begin inspection of the end area (14) of the tubular member (P) once positioned in the inspection sub-assembly (72); and
   (d) one or more robotic actuators (76) adapted to pick up the tubular member (P) being inspected, insert the end area (14) into the inspection sub-assembly (72), hold the tubular member (P) or rotate the tubular (P) and remove the end area (14) from the inspection sub-assembly (72) once end area inspection is completed.

18. A method of inspecting the end area (14) of the tubular member (P) using the system of claim 1, the method comprising:
   (a) positioning the movable carriage (4) about the end area of the tubular member (P) in an inspection position;
   (b) detecting variations in a magnetic field produced by flaws in the end area (14) of the tubular member (P), the inner and outer detector assemblies (8, 10) spaced the distance (D) from the tubular member (P); and
   (c) moving the movable carriage (4) to a rest position to retract the inner and outer detector assemblies (8, 10) away from the end area (14) of the tubular member (P).

19. A method of inspecting the end area (14) of the tubular member (P) using the system of claim 10, the method comprising:
   (a) positioning the end area (14) of the tubular member (P) in an inspection position in an inspection cabinet (70);
   (b) detecting variations in a magnetic field produced by flaws in the end area (14) of the tubular member (P), the inner and outer detector assemblies (8, 10) spaced the distance (D) from the tubular member (P); and
   (c) moving the end area (14) of the tubular member (P) to a rest position away from the inner and outer detector assemblies (8, 10).

20. A method of inspecting the end area (14) of the tubular member (P), using the system of claim 17, the method comprising:
   (a) initiating the one or more robotic actuators (76) to pick up the tubular member (P) and position the end area (14) of the tubular member (P) in an inspection position in the inspection cabinet (70);
   (b) detecting variations in a magnetic field produced by flaws in the end area (14) of the tubular member (P), the inner and outer detector assemblies (8, 10) spaced the distance (D) from the tubular member (P); and
   (c) initiating the one or more robotic actuators (76) to move the end area (14) of the tubular member (P) to a rest position away from the inner and outer detector assemblies (8, 10).

* * * * *